United States Patent
Caubet et al.

(10) Patent No.: US 10,570,856 B2
(45) Date of Patent: Feb. 25, 2020

(54) DEVICE FOR MODULATING A GAS EJECTION SECTION

(71) Applicant: ARIANEGROUP SAS, Paris (FR)

(72) Inventors: Pascal Caubet, Le Haillan (FR); Jean-Michel Larrieu, Le Haillan (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 15/745,255

(22) PCT Filed: Jul. 15, 2016

(86) PCT No.: PCT/FR2016/051823
§ 371 (c)(1),
(2) Date: Jan. 16, 2018

(87) PCT Pub. No.: WO2017/013341
PCT Pub. Date: Jan. 26, 2017

(65) Prior Publication Data
US 2018/0202393 A1    Jul. 19, 2018

(30) Foreign Application Priority Data

Jul. 17, 2015 (FR) .................................... 15 01529

(51) Int. Cl.
*F02K 9/86* (2006.01)
*F02K 9/80* (2006.01)

(52) U.S. Cl.
CPC ................ *F02K 9/86* (2013.01); *F02K 9/805* (2013.01); *F05D 2240/1281* (2013.01);
(Continued)

(58) Field of Classification Search
CPC ....... F02K 9/26; F02K 9/86; F05D 2240/1281
See application file for complete search history.

(56) References Cited

U.S. PATENT DOCUMENTS 3,567,942 A * 3/1971 Bach ...................... G01N 23/16
220/89.4
6,543,717 B1 * 4/2003 Le Fur ....................... F02K 9/86
244/3.22

(Continued)

FOREIGN PATENT DOCUMENTS

| EP | 2 143 927 A1 | 1/2010 |
| WO | 2014/135786 A1 | 9/2014 |
| WO | WO 2016/097602 A1 | 6/2016 |

OTHER PUBLICATIONS

International Search Report dated Oct. 26, 2016, in PCT/FR2016/051823 filed Jul. 15, 2016.

*Primary Examiner* — Steven M Sutherland
*Assistant Examiner* — Thuyhang N Nguyen
(74) *Attorney, Agent, or Firm* — Oblon, McClelland, Maier & Neustadt, L.L.P.

(57) ABSTRACT

A modulator device for modulating a gas ejection section, which device is for placing in a nozzle upstream from the throat of the nozzle and includes a plunger. The plunger has both a proximal portion connected to a control guide and also a distal portion in the form of a body of revolution, the plunger being movable between a retracted position and an extended position. The plunger presents, in its distal portion, a first section of concave shape and a second section of concave shape situated downstream from the first section.

11 Claims, 2 Drawing Sheets

(52) U.S. Cl.
 CPC .... *F05D 2250/41* (2013.01); *F05D 2250/712* (2013.01); *F05D 2260/36* (2013.01); *F05D 2270/051* (2013.01); *F05D 2270/303* (2013.01)

(56) References Cited

U.S. PATENT DOCUMENTS

| | | | |
|---|---|---|---|
| 6,629,416 B1 * | 10/2003 | Johnson | F02K 9/97 239/265.17 |
| 2010/0005807 A1 | 1/2010 | Goislot | |
| 2013/0298523 A1 | 11/2013 | Sims | |
| 2016/0003195 A1 | 1/2016 | Clermont et al. | |

* cited by examiner

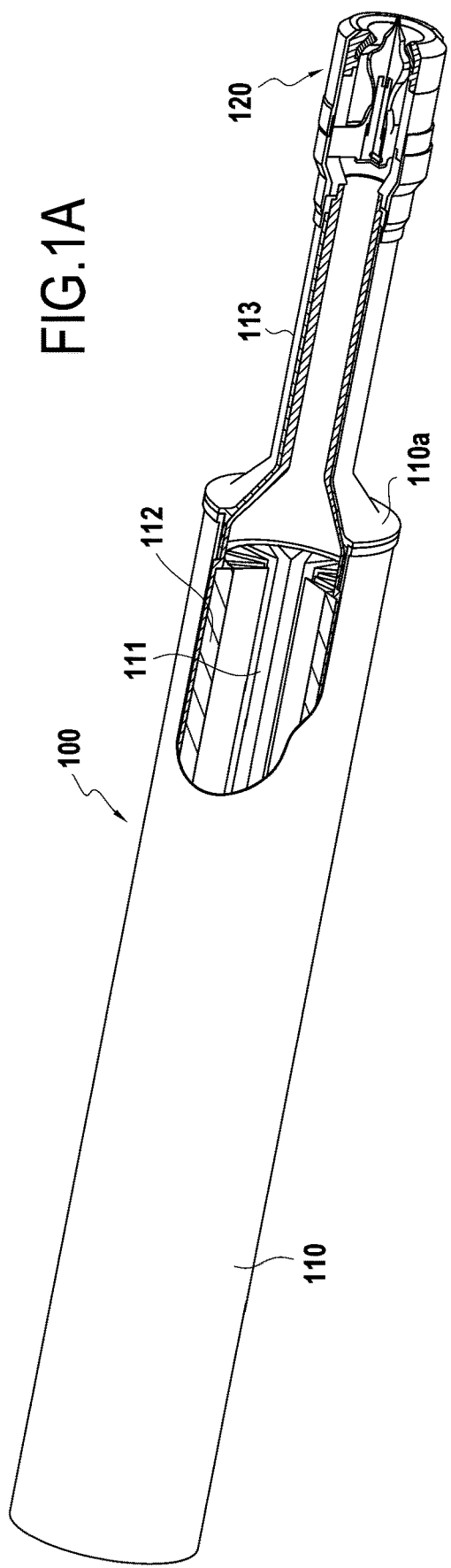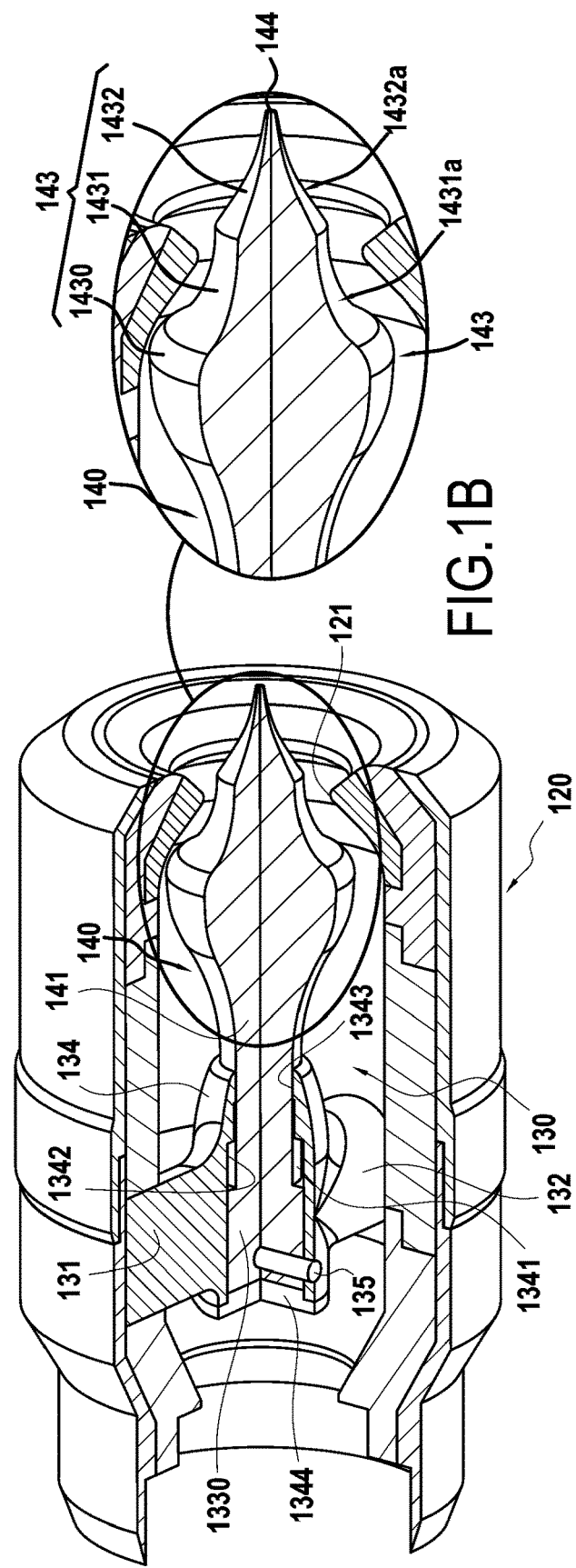

DEVICE FOR MODULATING A GAS EJECTION SECTION

BACKGROUND OF THE INVENTION

The present invention relates to the general field of thrusters or rocket engines for delivering thrust for driving vehicles such as missiles, launchers, or indeed satellites, by using the principle of propulsion by reaction or by ejecting gas. The invention relates more precisely, but not exclusively, to the nozzles that are fitted to solid propellant thrusters.

A solid propellant thruster is constituted mainly by a casing enclosing a block of propellant, an igniter, and a non-variable diverging nozzle. The block of propellant is pierced by a channel situated on the axis of the thruster, which channel serves as a combustion chamber. The igniter serves to ignite the propellant at one end of the casing, and combustion of the propellant propagates from the front towards the rear of the thruster. The propellant burns at a predefined speed, thereby producing combustion gas that is expelled via the nozzle.

The throat section of the nozzles serves to regulate combustion of the block of propellant in such a manner as to maintain the desired pressure inside the combustion chamber, while producing the expected thrust. Also, for a thruster that delivers thrust at a single rate, the throat section of the nozzle is not variable and is predetermined as a function of the desired level of thrust.

Nevertheless, having recourse to a single throat section is not appropriate for a thruster having two operating rates, typically one when operating at a high rate (acceleration) and another when operating at a lower rate (cruising), or for a thruster that is to fly at varying altitude.

In order to mitigate such a drawback, one known solution consists in providing the launcher with two distinct thrusters: one for an acceleration or "boost" stage, and another for a cruising stage. Nevertheless, such a solution has the drawback of significantly increasing the cost of the launcher.

It is also known to provide a nozzle with a throat of section that is variable. In practice, a plunger that is movable in translation is housed inside the nozzle. The position of the plunger in the flow of combustion gas serves to determine the flow section for the gas leaving the nozzle, and thus to adjust the ejection section of the gas to the operating rate of the thruster.

Nevertheless, although the use of a plunger provides a solution that is inexpensive and that enables a plurality of operating rates to be obtained in a single nozzle, thrust efficiencies are not optimized for those various operating rates.

OBJECT AND SUMMARY OF THE INVENTION

Consequently, an object of the invention is to propose an inexpensive solution for modulating the gas ejection section while optimizing the thrust efficiency for various operating rates.

For this purpose, according to the invention, there is provided a modulator device for modulating a gas ejection section, which device is for placing in a nozzle upstream from the throat of said nozzle, the modulator device comprising a plunger having both a proximal portion connected to a control guide and also a distal portion in the form of a body of revolution, the plunger being movable between a retracted position and an extended position; the device characterized in that the plunger presents, in its distal portion, a first section of concave shape and a second section of concave shape situated downstream from the first section.

The plunger of the device of the invention for modulating a gas ejection section presents two profiles in its distal portion serving to optimize efficiencies depending on the position of the plunger relative to the nozzle throat. Specifically, regardless of whether the plunger is in its retracted or its extended position, it always presents a section of concave shape in the nozzle throat, thereby acting as an expansion ramp for the gas ejected by the nozzle. Thrust efficiencies are thus optimized for the various operating rates that are determined by the position of the plunger relative to the nozzle throat.

According to a first characteristic of the invention, the second section presents a diameter that is smaller than the diameter of the first section.

According to a second characteristic of the invention, the control guide includes an internal housing in which the proximal portion of the plunger is present, the proximal portion of said plunger being suitable for sliding in the internal housing of the control guide between a first position in which said proximal portion of the plunger is present in an upstream portion of the internal housing, and a second position in which the proximal portion is present in a downstream portion of the internal housing, the proximal portion of the plunger being held in the first position by at least one retaining element suitable for breaking under the effect of heat or under the effect of a determined mechanical force.

The device of the invention for modulating a gas ejection section proposes a solution that is simple, inexpensive, and compact that makes it possible to define two modes of operation for a nozzle, specifically a first mode of operation at a high rate in which the partial shutter member is axially set back from the throat of the nozzle, and a second mode of operation at a lower rate in which the member for partially shutting the throat is extended axially further relative thereto. The changeover from the first mode of operation to the second mode of operation is obtained by breaking the retaining element(s). The use of one or more breakable or fusible retaining elements in combination with a plunger and a plunger guide makes it possible to define an architecture that is inexpensive, simple, and reliable for providing nozzles of variable throat section, and to do so without significantly increasing the weight or the size of the thruster.

Also, the device of the invention for modulating a gas ejection system makes it possible to avoid using two distinct thrusters (one thruster for the acceleration or "boost" stage, and another thruster for the cruising stage), and consequently makes it possible to propose a propulsion system at low cost that can provide both rates of operation.

According to an aspect of the device of the invention for modulating a gas ejection section, the retaining element(s) is/are made of material that is suitable for breaking from a determined temperature.

In another aspect, the device of the invention for modulating a gas ejection section includes at least one gas generator suitable for introducing gas between the upstream end of the internal housing and the end of the proximal portion of the plunger so as to break the retaining element(s) and cause the upstream end of the plunger to slide towards the downstream portion of the internal housing.

The invention also provides a nozzle of variable throat section having a nozzle throat characterized in that it further includes a modulator device of the invention for modulating a gas ejection section, said modulator device being placed in the nozzle upstream from said nozzle throat.

According to a particular characteristic of the nozzle of the invention, it is of the aerospike type, i.e. a nozzle operating without a diverging portion, thereby simultaneously reducing the cost, the weight, and the overall size of the thruster, while also making it possible to optimize the thrust of the vehicle, regardless of its altitude of operation.

The invention also provides a thruster including a variable throat section nozzle of the invention.

According to a particular characteristic of the thruster of the invention, the thruster comprises a casing containing a propellant charge, the nozzle of variable throat section being connected to the rear end of said casing by an extender or by a hinged connection.

BRIEF DESCRIPTION OF THE DRAWINGS

Other characteristics and advantages of the present invention appear from the following description made with reference to the accompanying drawings, which show an embodiment having no limiting character. In the figures:

FIGS. 1A and 1B are diagrammatic views in perspective and partially in section showing a thruster fitted with an aerospike nozzle incorporating a device for modulating the gas ejection section in accordance with an embodiment of the invention.

DETAILED DESCRIPTION OF THE INVENTION

Figure 2A:
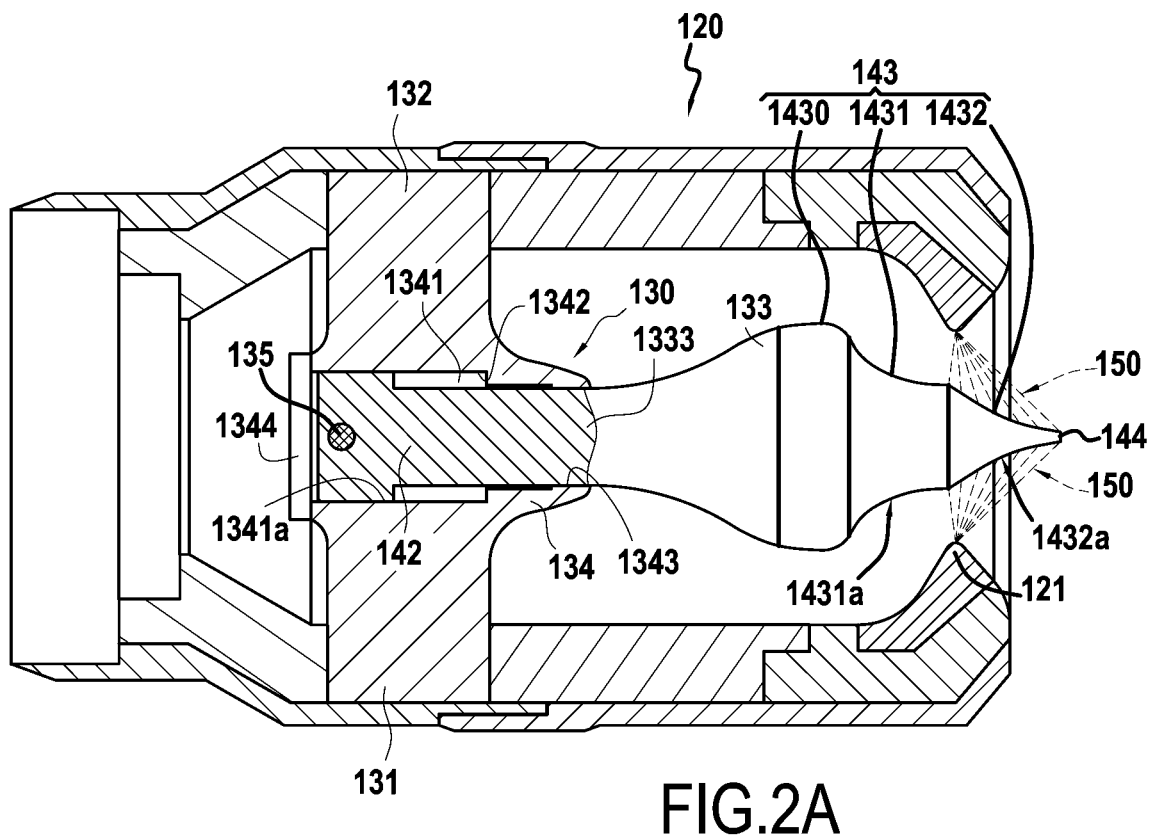
FIGS. 2A and 2B are diagrammatic longitudinal section views of the nozzle of FIGS. 1A and 1B.

The device of the invention for modulating a gas ejection section may be used with any type of nozzle, and in particular with nozzles whether or not they include a diverging portion.

FIG. 1A shows diagrammatically and in longitudinal section the rear portion of a thruster 100 comprising a cylindrical casing 110 surrounding a combustion chamber 111 in which there is housed a block of solid propellant 112. The chamber 111 opens out through the rear end 110a of the casing 110 upstream from an "aerospike" type nozzle 120. The term "aerospike" is used herein to mean a nozzle that has practically no diverging portion and that includes a plunger of concave profile capable of emerging through its throat. In the presently described embodiment, the nozzle 128 is connected to the rear end 110a via an extender 113. Nevertheless, in a variant embodiment of a thruster of the invention, the nozzle 120 could be connected directly to the rear end of the thruster casing, i.e. without the extender 113. In yet another variant embodiment of the thruster of the invention, the nozzle may be connected to the rear end of the thruster casing via a hinged connection, e.g. such as a ball joint, so as to enable the nozzle to be steered in several directions relative to the axis of the thruster casing.

In accordance with the invention, a device for modulating the gas ejection section 130 is arranged inside the nozzle 120 of the nozzle 120 (FIG. 1B). In the presently described example, the modulator device 130 is held in position by two arms 131 and 132 that are fastened to the inside wall of the nozzle 120. The arms 131 and 132 are arranged at 180° relative to each other, with the remainder of the circumferential space that is present around the modulator device being left free to allow the gas from the combustion chamber 111 to flow towards the nozzle throat 121

The modulator device for modulating the gas ejection section 130 comprises a plunger 140 comprising a rod 141 extending between a proximal portion 142 and a distal portion 143, said distal portion 143 having a diameter that decreases so as to form a member for partially shutting the nozzle throat 121. The modulator device 130 also comprises a control guide 134 comprising a wall 1342 defining an internal housing 1341 in which the proximal portion 142 of the plunger 140 is present. The plunger guide 134 also comprises a passage 1343 supporting the rod 141 of the plunger and guiding its movements.

In accordance with the invention and as shown in FIG. 1B, the distal portion 143 of the plunger 140 is in the form of a body of revolution and comprises in succession: a bulging portion 1430; a first section 1431 situated downstream from the bulging portion; and a second section 1432 situated downstream from the first section. The first section 1431 presents a concave surface 1431a between the bulging portion 1430 and the second section 1432. The second section 1432 also presents a concave surface 1432a between the first section 1431 and the free end 144 of the plunger. The second section 1432 presents a diameter that is smaller than the diameter of the first section 1431. The diameters of the first and second sections 1431 and 1432 decrease from upstream to downstream so as to confer a concave shape to each of the sections, where the term "the diameter of the second section is smaller than the diameter of the first section" is used to mean that, over its entire concave surface 1432a, the second section 1432 presents a diameter that is smaller than the smallest diameter of the first section 1431.

Figure 2B:
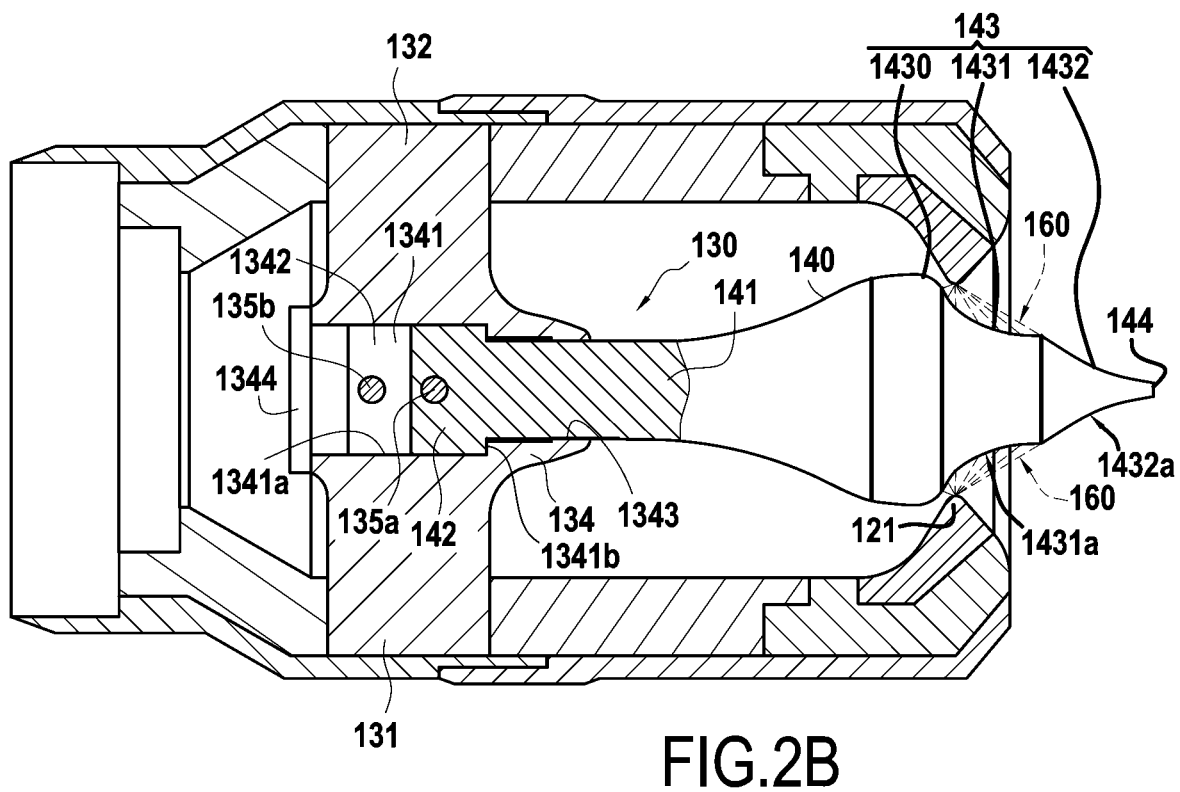

The plunger 140 is movable between a retracted position shown in FIG. 2A and an extended position shown in FIG. 2B. During the first stage of flight of the thruster, referred to as the "acceleration" stage, the device for modulating the gas ejection section 130 is to be found in the configuration shown in FIG. 2A, in which configuration the plunger 140 is in the retracted position. In the retracted position, the second section 1432 is positioned facing the nozzle throat 121. The presence of the concave surface 1432a of the second section 1432 in the nozzle throat 121 serves to create an expansion fan 150 of gas ejected by the nozzle. Since the expansion fan appears at the outlet from the throat 121, and consequently at the outlet from the nozzle 120, thrust efficiencies are optimized for this operating rate of the nozzle.

During the first stage of flight of the thruster, referred to as the "acceleration" stage, the device for modulating the gas ejection section 130 is to be found in the configuration shown in FIG. 2A, in which configuration the plunger 140 is in the retracted position. In the retracted position, the second section 1432 is positioned facing the nozzle throat 121. The presence of the concave surface 1432a of the second section 1432 in the nozzle throat 121 serves to create a first expansion fan 150 of gas ejected by the nozzle. Since the expansion fan appears at the outlet from the throat 121, and consequently at the outlet from the nozzle 120, thrust efficiencies are optimized for this operating rate of the nozzle.

During the second stage of flight of the thruster, referred to as the "cruising" stage, the device for modulating the gas ejection section 130 is to be found in the configuration shown in FIG. 2B, in which configuration the plunger 140 is in the extended position. In the extended position, the first section 1431 is positioned facing the nozzle throat 121. The presence of the concave surface 1431a of the first section 1431 in the nozzle throat 121 serves to create a second expansion fan 160 of gas ejected by the nozzle. Since the expansion fan appears at the outlet from the throat 121, and consequently at the outlet from the nozzle 120, thrust efficiencies are optimized for this operating rate of the nozzle.

As shown in FIGS. 2A and 2B, the proximal portion 142 of the plunger 140 can slide in the internal housing 1341 of the control guide 134 between a first position, corresponding to the above-described retracted position of the plunger 140, in which the proximal portion 142 of the plunger 140 is present in an upstream portion 1341a of the internal housing 1341 (FIG. 2A), and a second position, corresponding to the extended position of the plunger 140, in which the proximal portion 142 is present in the downstream portion 1341b of the internal housing 1341 (FIG. 2B).

In the presently described embodiment, the proximal portion 142 of the plunger 140 is held in the first position by a retaining element, specifically a pin 135, that passes both through the proximal portion 142 of the plunger and through the wall 1342 of the plunger guide 134. In the presently described embodiment, the pin 135 is made of a material that is suitable for giving way, by melting or softening, as from a determined temperature. As examples:

- for a plunger-release temperature determined to be about 85° C., the pin 135 may be made in particular out of acrylonitrile butadiene styrene (ABS);
- for a plunger-release temperature determined to be about 400° C., the pin 135 may be made in particular out of aluminum; and
- for a plunger-release temperature determined to be higher than 800° C., the pin 135 may be made in particular out of a metal alloy having shape memory.

Alloys having shape memory can be used in general manner for making the retaining element(s) of the device of the invention, with their compositions being determined as a function of the intended plunger-release temperature.

During the first stage of flight of the thruster, referred to as the "acceleration" stage, the device for modulating the gas ejection section 130 is to be found in the configuration shown in FIG. 2A. During this first stage of flight, the combustion gas flowing in the nozzle 120 transmits heat to the pin 135. Once the breaking temperature of the pin 135 has been reached (melting or softening temperature), the pin loses its mechanical integrity and no longer acts as a retaining element for the proximal portion 142 of the plunger 140, which then moves, under the effect of suction from the pressure forces generated in the nozzle, in translation into the position shown in FIG. 2B. A first portion 135a of the pin 135 then remains in the proximal portion 142 of the plunger, while a second portion 135b remains in the wall 1342 of the plunger guide.

In the presently described embodiment, the upstream portion 1341a of the internal housing 1341 is closed by a plug 1344 made out of a material having thermal conductivity that serves to delay the transmission of heat from the gas to the pin, and consequently to delay the instant at which the pin breaks. In particular, the plug may be made out of a carbon/carbon (C/C) composite material comprising a reinforcing texture made out of carbon fibers and densified by a pyrolytic carbon matrix, or out of a low density ceramic matrix composite (CMC) material comprising a reinforcing texture made out of refractory fibers (carbon or ceramic fibers) densified by a matrix that is at least partially ceramic, or else out of an organic matrix composite (OMC) material comprising a reinforcing texture made out of refractory fibers (carbon or ceramic fibers) densified by an organic matrix (resin). Nevertheless, the modulator device may also be used without closing the upstream portion 1341a of the internal housing 1341.

In other embodiments, the pin that passes both through the proximal portion of the plunger and through the wall of the plunger guide no longer gives way under the effect of heat, but as a result of a mechanical force being exerted on the upstream end of the plunger. Under such circumstances, the device for modulating the gas ejection section also has a gas generator, e.g. a pyrotechnic cartridge housed in one of the arms of the modulator device or a valve connected to a duct that opens out into a portion of the thruster where a fraction of the combustion gas can be taken off, such as for example into the combustion chamber.

The gas generator is suitable, on command, for sending a gas under pressure into the upstream portion of the internal housing between the end of said internal housing and the end of the proximal portion of the plunger so as to break the pin and cause the upstream end of the plunger to slide towards the downstream portion of the internal housing. Under such circumstances, the pin is designed in such a manner as to break under the pressure force exerted by the gas that is applied. The pin may be made in particular out of aluminum or out of steel.

In the above-described embodiments, the retaining element is constituted by a pin. Nevertheless, the way the retaining element is made in the present invention is not limited to a pin, and it could present some other shape and/or structure. In a variant embodiment, the plunger may include projections on its proximal portion that form retaining elements. Under such circumstances, the internal housing of the plunger guide of the device for modulating the gas ejection section includes an upstream portion suitable for housing the proximal portion of the plunger together with its projections, and a downstream portion presenting dimensions that are smaller than the dimensions of the upstream portion so as to define an abutment. Thus, during the first stage of flight, the plunger is held in the retracted position. Once the first stage of flight has terminated, the projections are broken, either by heat, or by a pressure force as described above, so as to enable the plunger to move in translation into the extended position, as described above.

The device of the invention for modulating a gas ejection section may be used in thrusters, rocket engines, or launchers using propulsion that is solid propulsion (solid propellant), liquid (liquid propellant), or hybrid (both solid and liquid propellants).

The invention claimed is:

1. A modulator device for modulating a gas ejection section, said modulator device is for placing in a nozzle upstream from a throat of said nozzle, the modulator device comprising both a plunger having a proximal portion connected to a control guide and also a distal portion in a form of a body of revolution; the plunger being movable between a retracted position and an extended position;
   wherein the plunger presents, in the distal portion of the plunger, a first section of concave shape and a second section of concave shape situated downstream from the first section,
   wherein a first curvature of the concave shave of the first section continues downstream along the distal portion to a break, the break configured to change direction of the first curvature to become a second curvature to define the concave shape of the second section, and
   wherein the second section presents a diameter that is smaller than a diameter of the first section.

2. The modulator device according to claim 1, wherein the control guide includes an internal housing in which the proximal portion of the plunger is present, the proximal portion of said plunger being suitable for sliding in the internal housing of the control guide between a first position in which said proximal portion of the plunger is present in an upstream portion of the internal housing, and a second position in which said proximal portion is present in a downstream portion of the internal housing, the proximal portion of said plunger being held in the first position by at least one retaining element suitable for breaking under an effect of heat or under an effect of a determined mechanical force.

3. The modulator device according to claim 2, wherein said at least one retaining element is made of material suitable for breaking from a determined temperature.

4. The modulator device according to claim 2, wherein the modulator device includes at least one gas generator suitable for introducing gas between said upstream portion of the internal housing and an end of the proximal portion of the plunger so as to break the at least one retaining element and cause an upstream end of the plunger to slide towards the downstream portion of the internal housing.

5. A nozzle of variable throat section comprising said variable throat section and the modulator device for modulating the gas ejection section according to claim 1, said modulator device being placed in the nozzle upstream from said variable throat section.

6. The nozzle according to claim 5, wherein said nozzle is an aerospike nozzle.

7. A thruster comprising the nozzle of variable throat section according to claim 6.

8. The thruster according to claim 7, further comprising a casing containing a propellant charge, the nozzle of variable throat section being connected to a rear end of said casing by an extender or by a hinged connection.

9. The modulator device according to claim 1, wherein the first and second sections have different curvatures.

10. The modulator device according to claim 1, wherein the first and second sections have discontinuous curvatures.

11. The modulator device according to claim 1, wherein the first and second sections are distinct sections from each other and separated by a delimitation.

* * * * *